(12) United States Patent
Lin

(10) Patent No.: US 8,425,129 B2
(45) Date of Patent: Apr. 23, 2013

(54) OPTICAL FIBER CONNECTOR

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 276 days.

(21) Appl. No.: 12/982,788

(22) Filed: Dec. 30, 2010

(65) Prior Publication Data

US 2011/0249945 A1  Oct. 13, 2011

(30) Foreign Application Priority Data

Apr. 8, 2010 (TW) ................ 99110831 A

(51) Int. Cl.
*G02B 6/36* (2006.01)
*G02B 6/38* (2006.01)

(52) U.S. Cl.
USPC ............ 385/84; 385/59; 385/60; 385/64; 385/66; 385/68; 385/70; 385/71; 385/72; 385/76; 385/77; 385/78

(58) Field of Classification Search .......... 385/68, 385/72, 84
See application file for complete search history.

(56) References Cited

U.S. PATENT DOCUMENTS

2003/0002805 A1\* 1/2003 Trezza et al. ............ 385/59

\* cited by examiner

*Primary Examiner* — Ryan Lepisto
(74) *Attorney, Agent, or Firm* — Altis Law Group, Inc.

(57) ABSTRACT

An optical couple connector includes a first main body and a second main body. A through hole is defined in the first main body. A blind hole and a lens are defined in the second main body. The diameter of the blind hole is less than that of the through hole. The through hole is coaxial with the blind hole and is used to hold an optical fiber. The lens couples to the optical fiber.

5 Claims, 4 Drawing Sheets

OPTICAL FIBER CONNECTOR

BACKGROUND

1. Technical Field

The present disclosure relates to optical fiber connectors.

2. Description of Related Art

Optical fiber connectors often include a blind hole and a lens integrated with the blind hole. The blind hole is used to receive an optical fiber coupled with the lens to transform optical signals.

The diameter of an optical fiber is generally about 62.5 micrometers. So, the blind hole must have a similar diameter but will be longer than its diameter.

In an injection device for molding the optical fiber connector, an insert for forming the blind hole is both long and thin, and must be within strict tolerances; otherwise, characteristics of the blind hole of the optical fiber connector will be poor.

BRIEF DESCRIPTION OF THE DRAWINGS

Many aspects of the present optical fiber connector can be better understood with reference to the following drawings. The components in the drawings are not necessarily drawn to scale, the emphasis instead being placed upon clearly illustrating the principles of the present optical fiber connector. Moreover, in the drawings, like reference numerals designate corresponding parts throughout the several views.

DETAILED DESCRIPTION

Embodiments of the present optical fiber connector will now be described in detail below and with reference to the drawings.

Figure 1:
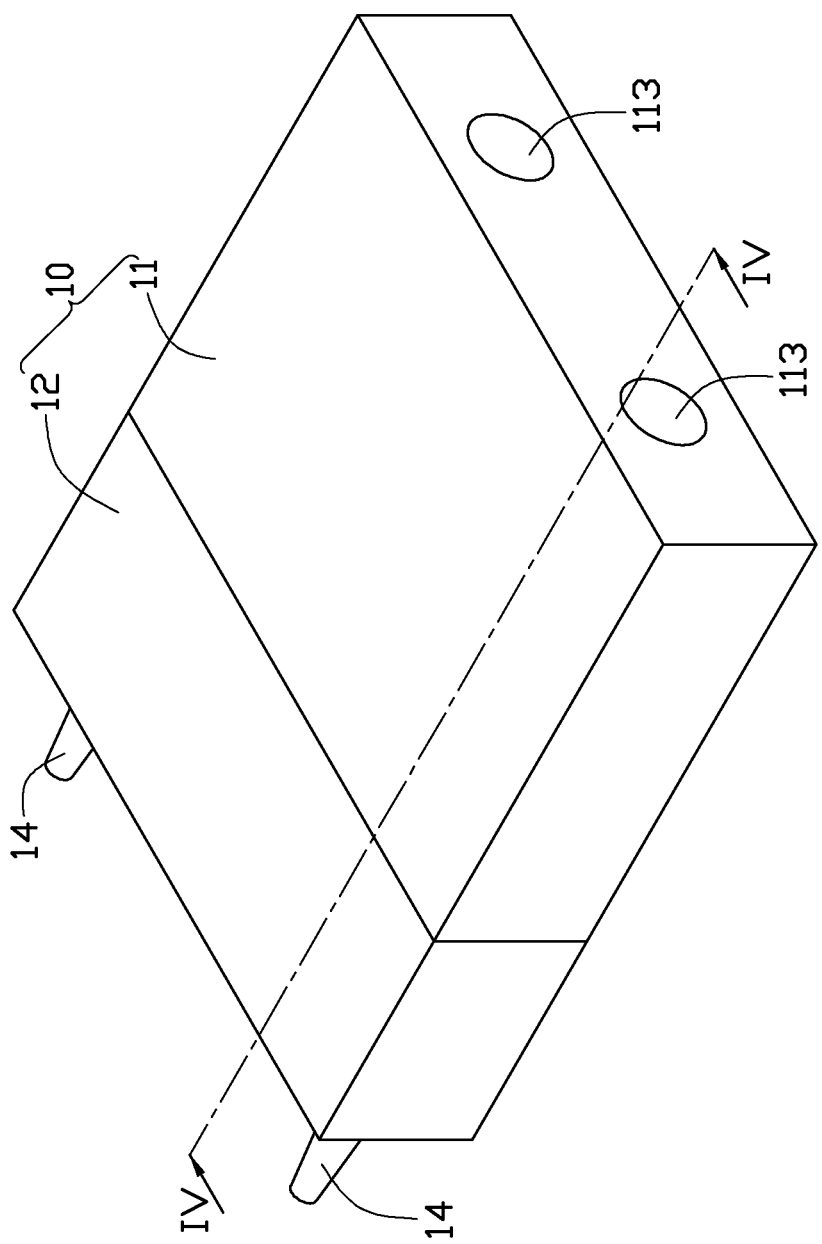
FIG. 1 is a schematic view of an optical fiber connector of an embodiment.
Figure 2:
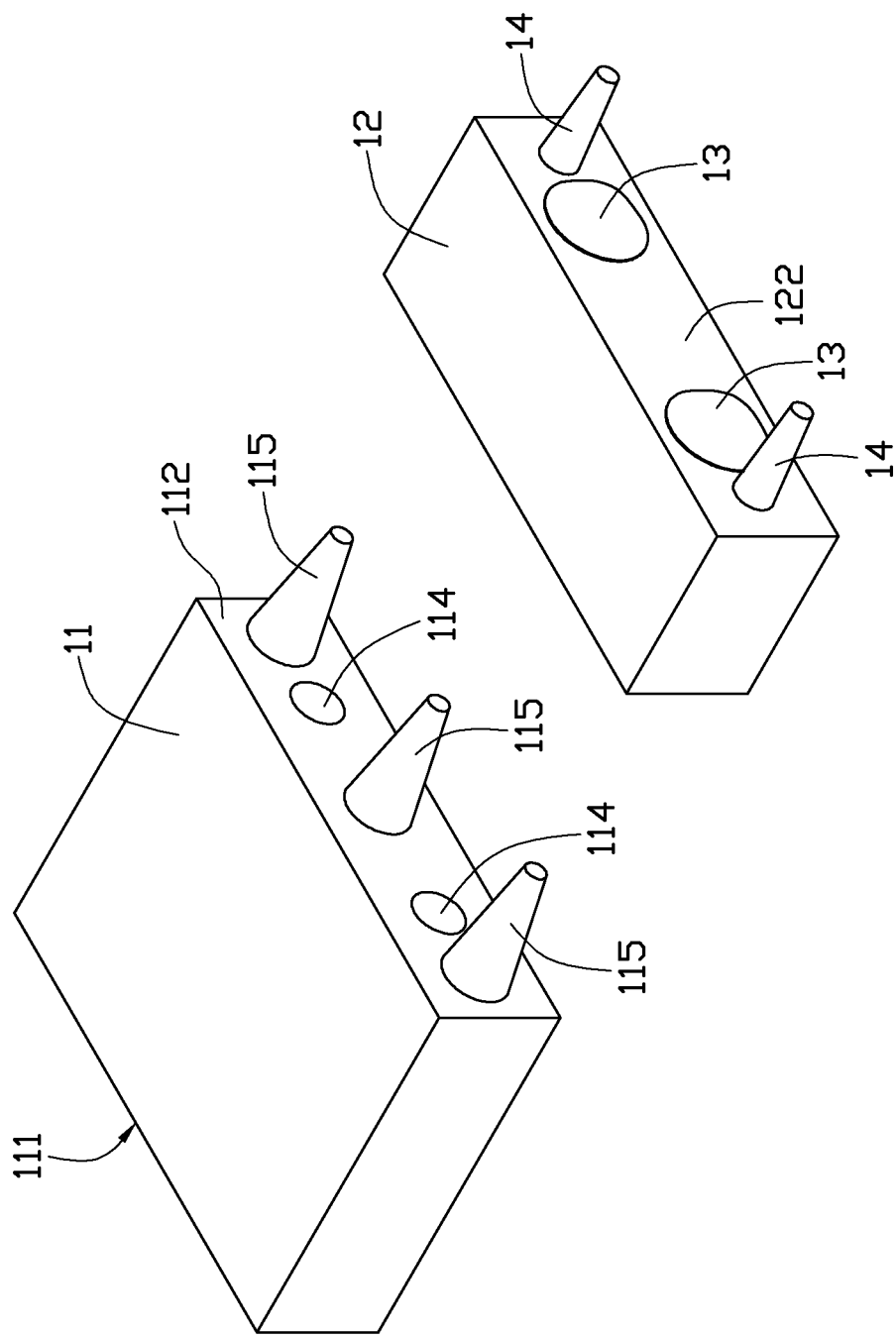
FIG. 2 is an exploded perspective view of the optical fiber connector shown in FIG. 1.
Figure 3:
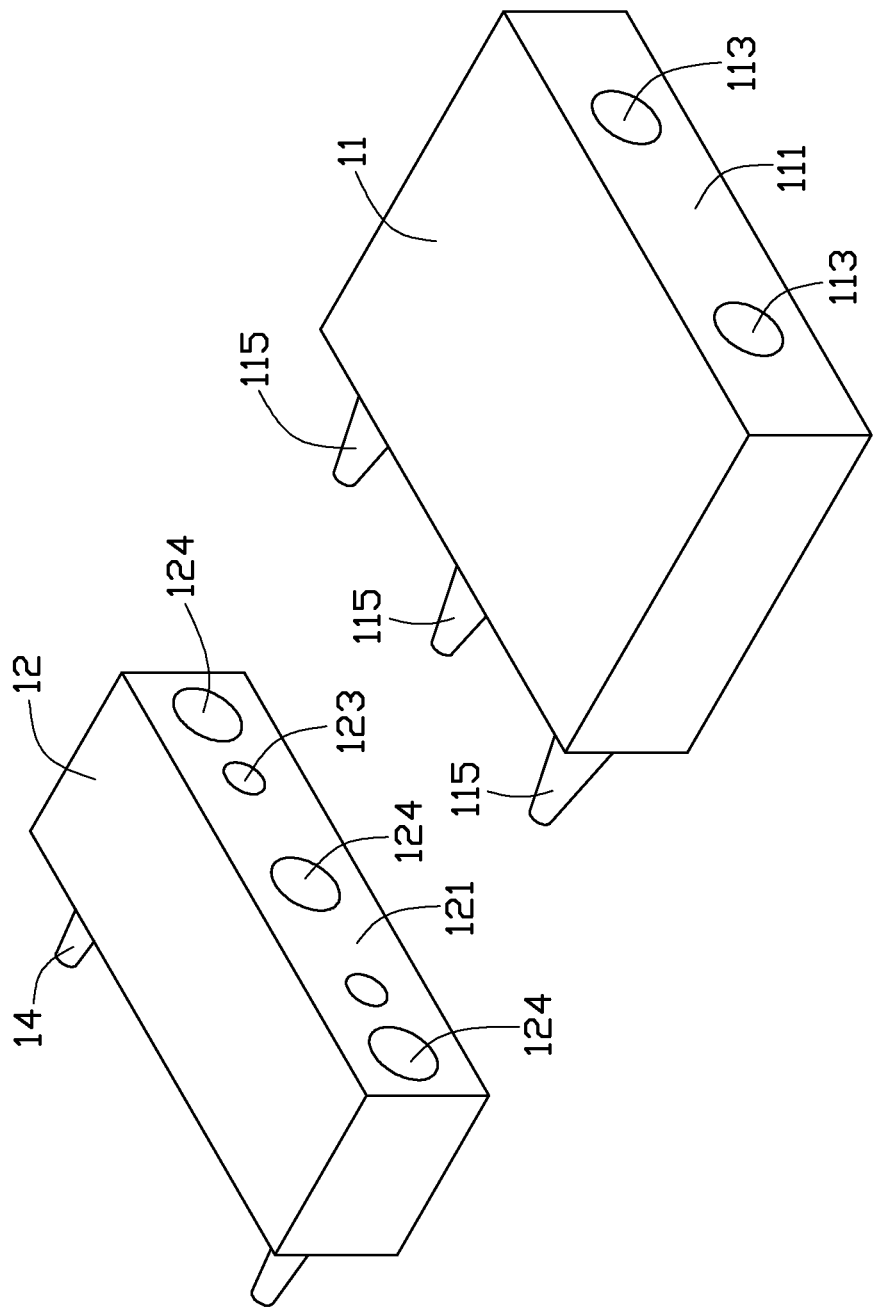
FIG. 3 is similar to FIG. 2, but viewed from another aspect.
Figure 4:
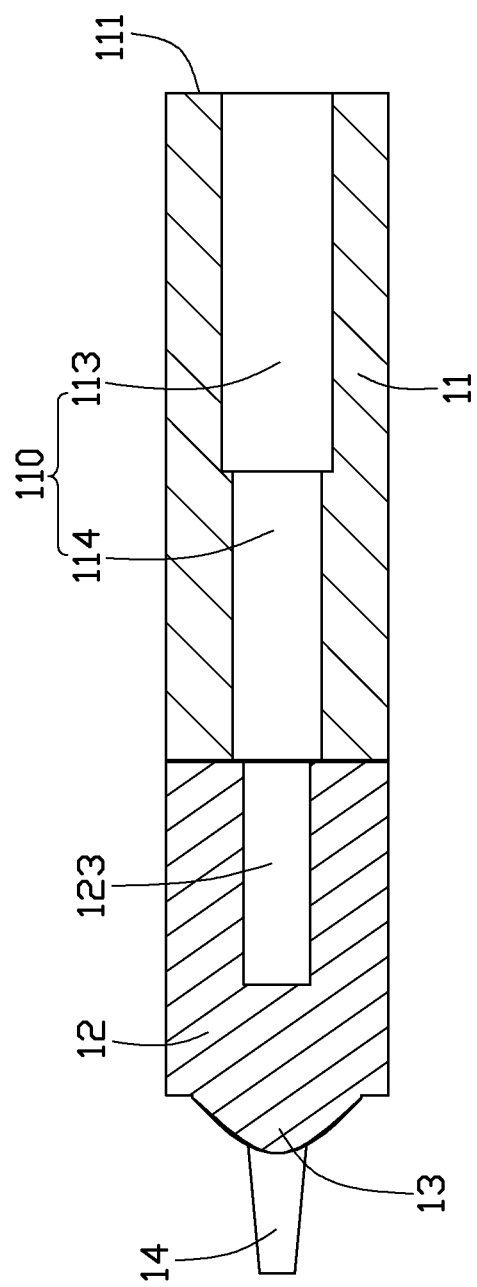
FIG. 4 is a cross-sectional view taken along the line IV-IV of FIG. 1.

Referring to FIG. 1 to FIG. 4, an optical fiber connector 10 in accordance with an embodiment is shown. The optical fiber connector 10 is configured for transforming signals.

The optical fiber connector 10 includes a first unit 11, a second unit 12, and two lenses 13 formed on the second unit 12.

The first unit 11 is substantially rectangular. The first unit 11 has a first surface 111 and a second surface 112 opposite to the first surface 111. Two through holes 110 are defined in the first unit 11. Each of the through hole 110 includes a first holes portion 113 and a second hole portion 114. Three first alignment members 115 are arranged on the second surface 112. The first hole portion 113 is coaxial with the second hole portion 114. The diameter of the first holes portion 113 is larger than that of the second holes portion 114.

In this embodiment, the first alignment member 115 is, particularly, a conical post. In another embodiment, the first alignment member 115 can be a hole.

The second unit 12 is substantially rectangular. The second unit 12 has a third surface 121 and a fourth surface 122 opposite to the third surface 121. Two blind holes 123 are defined in the second unit 12. The blind hole 123 is coaxial with both the second hole portion 114 and the lens 13. Three second alignment members 124 are formed on the third surface 121 and engaged with first alignment members 124. Two protrusions 14 are arranged on the fourth surface 122 and protrude from the fourth surface 122. The protrusions 14 are configured for positioning the optical fiber connector 10 to an electric device.

Among the blind hole 123, the first hole portion 113, and the second hole portion 114, the diameter and length of the blind hole 123 are the smallest and the diameter of the first hole portion 113 is the largest.

During assembly, the first alignment member 115 is inserted into the second alignment member 124, thus, the second surface 112 of the first unit 11 is contacted with the third surface 121 of the second unit 12, so the first unit 11 is assembled together thereat with the second unit 12. The blind hole 123 and the through hole 110 cooperatively define a space for receiving an optical fiber. The optical fiber is coupled with the lens 13 to transform optical signals.

It is understood that in other embodiments, the number of the first pointer 115, the second alignment member 124, the blind hole 123, the first hole portion 113, and the second hole portion 114 can be set according to need.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical fiber connector, comprising:
   a first unit including a first surface, a second surface opposite to the first surface, and a through hole, the through hole passing through the first surface and the second surface, the through hole comprising a first hole portion and a second hole portion, a diameter of the first hole portion being larger than that of the second hole portion, diameters at different positions of the first hole portion being identical, diameters at different positions of the second hole portion being identical, a first alignment member arranged at the second surface; and
   a second unit including a third surface, a fourth surface opposite to the third surface, a lens arranged at the fourth surface, and a blind hole defined in the third surface, the lens aligned with the blind hole, a second alignment member arranged at the third surface and engaged with the first alignment member, the blind hole aligned with the through hole, the blind hole and the through hole cooperating to receive an optical fiber therein, a diameter of the blind hole being smaller than that of the second hole portion.

2. The optical fiber connector as described in claim 1, wherein the length of the blind hole is smaller than that of the through hole.

3. The optical fiber connector as described in claim 1, wherein the second alignment member includes a hole, the first alignment member is a post inserted into the hole.

4. The optical fiber connector as described in claim 1, wherein a protrusion is located on the fourth surface of the second unit.

5. The optical fiber connector as described in claim 3, wherein the post is conical-shaped.

* * * * *